United States Patent
Xu et al.

(10) Patent No.: US 12,532,379 B2
(45) Date of Patent: Jan. 20, 2026

(54) METHODS AND APPARATUS OF A USER EQUIPMENT FOR SUBSEQUENT TRANSMISSION IN INACTIVE STATE IN WIRELESS COMMUNICATION

(71) Applicant: Apple Inc., Cupertino, CA (US)

(72) Inventors: Fangli Xu, Cupertino, CA (US); Chunhai Yao, Cupertino, CA (US); Dawei Zhang, Cupertino, CA (US); Haijing Hu, Cupertino, CA (US); Sarma V. Vangala, Cupertino, CA (US); Srinivasan Nimmala, Cupertino, CA (US); Murtaza A Shikari, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,242

(22) PCT Filed: Sep. 28, 2020

(86) PCT No.: PCT/CN2020/118285
§ 371 (c)(1),
(2) Date: Oct. 14, 2021

(87) PCT Pub. No.: WO2022/061853
PCT Pub. Date: Mar. 31, 2022

(65) Prior Publication Data
US 2023/0217530 A1    Jul. 6, 2023

(51) Int. Cl.
*H04W 76/27* (2018.01)
*H04W 52/02* (2009.01)

(52) U.S. Cl.
CPC ........ *H04W 76/27* (2018.02); *H04W 52/0229* (2013.01)

(58) Field of Classification Search
CPC . H04W 76/27; H04W 52/0229; H04W 48/20; H04W 8/00; Y02D 30/70
See application file for complete search history.

(56) References Cited

U.S. PATENT DOCUMENTS

| | | | |
|---|---|---|---|
| 2019/0174571 A1* | 6/2019 | Deenoo | H04W 68/02 |
| 2020/0015074 A1* | 1/2020 | Kim | H04W 12/108 |

(Continued)

FOREIGN PATENT DOCUMENTS

| | | |
|---|---|---|
| CN | 111201830 A | 5/2020 |
| CN | 111713174 A | 9/2020 |

(Continued)

OTHER PUBLICATIONS

Ericsson, "Discussion to RAN2 LS R2-1902693", 3GPP TSG CT WG1 Meeting #116, Xi'an (P.R. of China), C1-192020, Apr. 8-12, 2019, 5 pages.

(Continued)

*Primary Examiner* — Fahmida S Chowdhury
(74) *Attorney, Agent, or Firm* — Kubota & Basol LLP

(57) ABSTRACT

A user equipment (UE) device including an antenna, a memory, a RF circuitry commutatively coupled to the antenna, and a processor configured to perform operations is described. In an exemplary embodiment, the operations include receiving a Radio Resource Control (RRC) release message from a base station, wherein the RRC release message comprises a suspend configuration to transition the UE to an RRC_INACTIVE state. In addition, the operations include entering the RRC_INACTIVE state. The operations include performing, while the UE is in the RRC_INACTIVE state, an initial data transmission without transitioning from the RRC_INACTIVE state to a RRC_CONNECTED state. Additionally, the operations include monitoring a physical downlink control channel (PDCCH) for a UE dedicated scheduling for a transmission or reception of a subsequent (Continued)

UE behavior during the subsequent active period in INACTIVE data during an active period, while the UE is in the RRC INACTIVE state. Further, the operations include performing the transmission or reception of the subsequent data based on the monitoring of the PDCCH.

17 Claims, 16 Drawing Sheets

(56) References Cited

U.S. PATENT DOCUMENTS

| | | | |
|---|---|---|---|
| 2020/0029239 A1* | 1/2020 | Chen | H04W 76/19 |
| 2020/0322918 A1* | 10/2020 | Shih | H04W 76/11 |
| 2020/0329455 A1* | 10/2020 | Ryu | H04W 76/28 |
| 2020/0396633 A1* | 12/2020 | Tseng | H04W 24/10 |
| 2020/0403743 A1* | 12/2020 | Bergqvist | H04L 5/0032 |
| 2020/0413476 A1* | 12/2020 | He | H04W 80/02 |
| 2021/0022055 A1* | 1/2021 | Tseng | H04W 36/362 |
| 2021/0105649 A1* | 4/2021 | Lee | H04W 24/10 |
| 2021/0329559 A1* | 10/2021 | Huang | H04W 52/0235 |
| 2021/0360727 A1* | 11/2021 | Hsieh | H04W 12/06 |
| 2022/0014985 A1* | 1/2022 | Da Silva | H04W 36/00838 |
| 2022/0046749 A1* | 2/2022 | Lin | H04W 76/30 |
| 2022/0070788 A1* | 3/2022 | Wu | H04W 48/02 |
| 2022/0095409 A1* | 3/2022 | Agiwal | H04W 74/0833 |
| 2022/0116809 A1* | 4/2022 | Cheng | H04W 76/19 |
| 2022/0150741 A1* | 5/2022 | Teyeb | H04L 5/001 |
| 2022/0345269 A1* | 10/2022 | Alriksson | H04W 74/0808 |
| 2023/0041246 A1* | 2/2023 | You | H04W 76/27 |
| 2023/0120407 A1* | 4/2023 | Huang | H04W 76/19 370/329 |
| 2023/0413374 A1 | 12/2023 | Tsai et al. | |
| 2024/0032135 A1* | 1/2024 | Cheng | H04W 76/27 |

FOREIGN PATENT DOCUMENTS

| | | | | |
|---|---|---|---|---|
| CN | 116438850 A | 7/2023 | | |
| IN | 201944044974 A | 5/2020 | | |
| WO | 2019/073091 A1 | 4/2019 | | |
| WO | WO-2020034560 A1 * | 2/2020 | ........ | H04W 28/0278 |
| WO | 2021/253208 A1 | 12/2021 | | |
| WO | 2022/060005 A1 | 3/2022 | | |

OTHER PUBLICATIONS

European Search Report and Search Opinion received for European Application No. 20954704.1, mailed on Mar. 25, 2024, 12 pages.
International Preliminary Report on Patentability received for PCT Patent Application No. PCT/CN2020/118285, mailed on Apr. 6, 2023, 5 pages.
International Search Report and Written Opinion received for PCT Patent Application No. PCT/CN2020/118285, mailed on Jun. 30, 2021, 6 pages.
LG Electronics., "Discussion on the handling of lower layer indication", 3GPP TSG CT WG1 Meeting #116, Xi'an, P.R. of China, C1-192344, Apr. 8-12, 2019, 4 pages.
CN Office Action, including Search Report received for Chinese Patent Application No. 202080105569.8, mailed on Jun. 24, 2024, 8 pages (4 pages of English Translation and 4 pages of Original Document).
Extended European Search Report received for European Application No. 20954704.1, mailed on Jun. 18, 2024, 12 pages.
Search Report received for Chinese Patent Application No. 202080105569.8 mailed on Feb. 19, 2025, 4 pages (2 pages of English Translation and 2 pages of Official Copy).

* cited by examiner

UE Triggered transition from RRC_INACTIVE to RRC_CONNECTED
(Legacy Procedure)

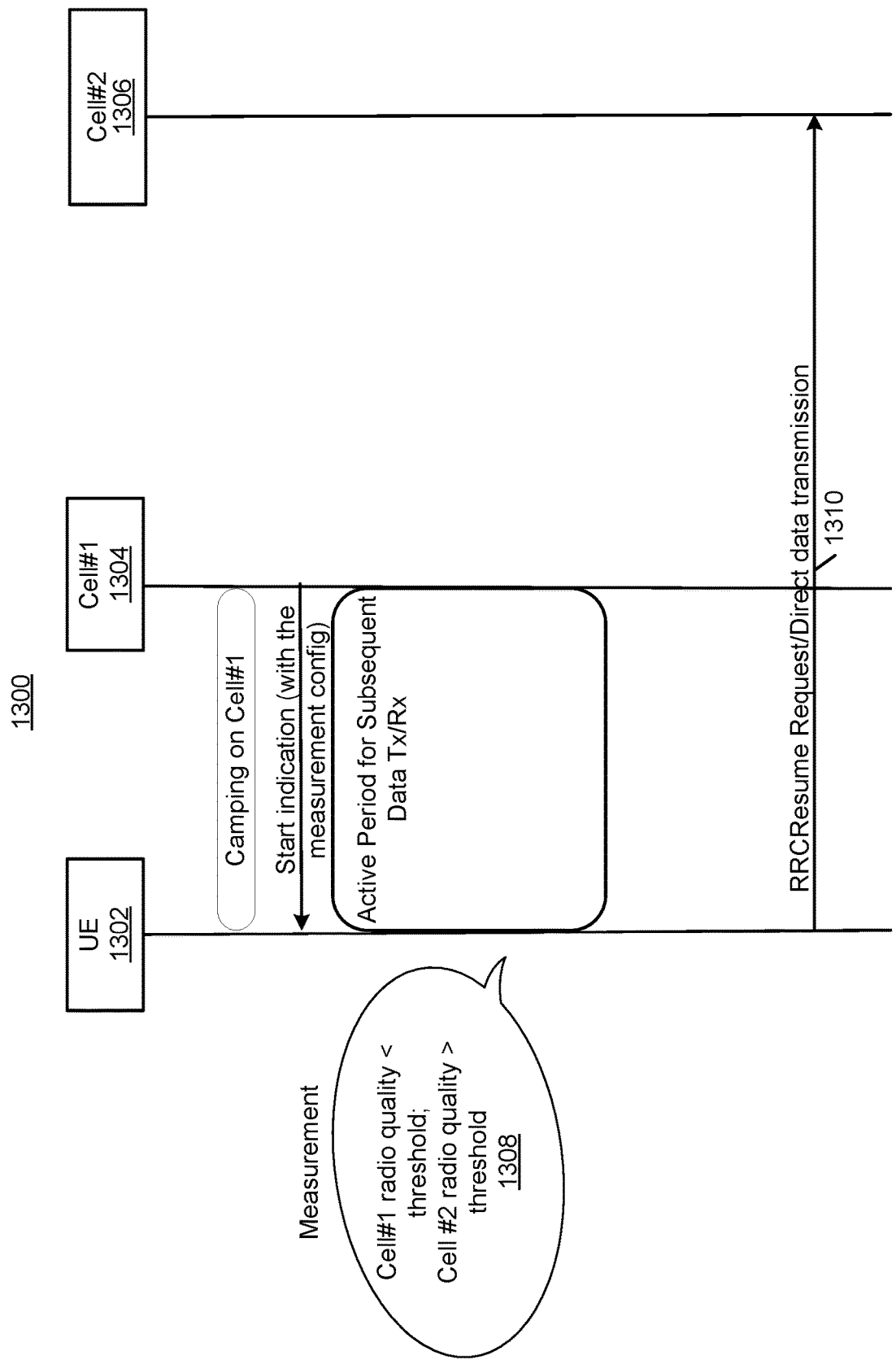

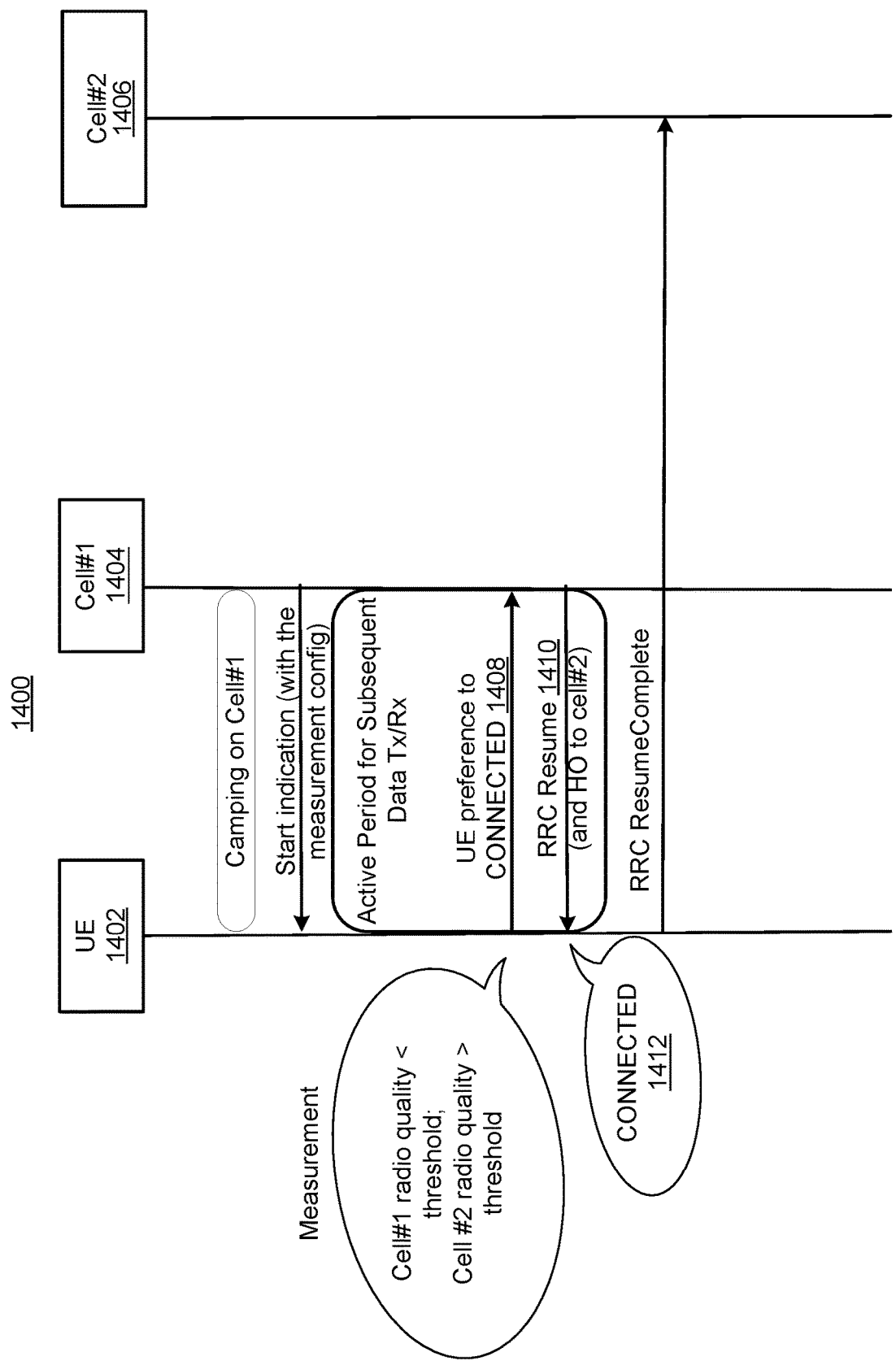

METHODS AND APPARATUS OF A USER EQUIPMENT FOR SUBSEQUENT TRANSMISSION IN INACTIVE STATE IN WIRELESS COMMUNICATION

RELATED APPLICATIONS

The present application is the national phase of International Application No. PCT/CN2020/118285, filed on Sep. 28, 2020 and the disclosure of which is hereby incorporated herein by reference in its entirety.

FIELD OF INVENTION

This invention relates generally to wireless technology and more particularly to methods and apparatus for subsequent data transmission for a user equipment (UE) in inactive state.

BACKGROUND OF THE INVENTION

In a wireless communications network, 5G New radio (NR) provides a faster network with higher capacity that can facilitate control of Internet of Things (IoT) such as remote devices in applications where real-time network performance is critical. With an increasing demand for a faster data exchange and seamless communication, lowering latency and battery consumption has been pivotal in supporting such demand maintaining the performance of the 5G NR technology.

5G NR supports three RRC states including RRC CONNECTED, RRC INACTIVE, and RRC IDLE. 5G NR protocol stacks, including a control plane and a user plane, provides connectivity between the UE and the gNB or the core network (CN). In terms of control plane for the Release-15 INACTIVE state, the UE has non-access stratum (NAS) connection to the CN. Additionally, the UE has no dedicated access stratum (AS) resource the UE maintains the RRC configuration before the UE entering INACTIVE state. In terms of user plane for the Release-15 INACTIVE state, the UE cannot perform any dedicated data transmission/reception. If UE has dedicated data transmission/reception, the UE should enter CONNECTED state. Specifically, For DL data transmission, gNodeB pages the UE via RAN-paging mechanism to trigger UE to enter CONNECTED state. For uplink (UL) data transmission, the UE will trigger RACH procedure to enter the CONNECTED state. In terms of mobility for the Release-15 INACTIVE state, the UE in the INACTIVE state can move within an RNA (i.e. RAN notification area) without notifying NG-RAN. Cell selection/re-selection procedure is the same as in RRC_IDLE state.

There are three common state transitions scenarios between the INACTIVE and CONNECTED states. First, state transition from the CONNECTED state to the INACTIVE state includes RRC Release with suspend information. State transition from the INACTIVE state to the CONNECTED state includes RRC Resume procedure. State transition from the INACTIVE to the IDLE states includes (1) RRC Release and (2) abnormal case (cannot find cell for camping).

UEs with small and infrequent data transmission are generally maintained by the network in the RRC_INACTIVE state. Smartphone applications such as traffic from instant messaging services and push notifications from mobile applications are some examples of small and infrequent data traffic. Connection setup and subsequently release to INACTIVE state happens for each data transmission results in unnecessary power consumption and signaling overhead.

Usually an uplink or downlink (DL) transmission will be accompanied by a feedback transmission in DL/UL (e.g., TCP ACK, or RLC status report). If the UE performs the first UL transmission and then directly returns to the INACTIVE state, NW has to perform RAN paging to trigger the UE to return to the CONNECTED state for a feedback reception when NW transmits the feedback in the downlink direction. Such procedure can eliminate the benefit of direct transmission in INACTIVE state.

Thus, there is a need for an enhanced mechanism for the UE to keep on monitoring the potential NW scheduling after the first data transmission in the INACTIVE state, thereby reducing the data transmission latency and the amount of signaling overhead that occurs during state transitions. Accordingly, this enhanced mechanism can leverage the benefit of direct transmission in INACTIVE state.

SUMMARY OF THE DESCRIPTION

Method that an apparatus of device is described. In an exemplary embodiment, a user equipment (UE) device having a processor configured to perform operations including receiving a Radio Resource Control (RRC) release message from a base station. The RRC release message includes a suspend configuration to transition the UE to an RRC_INACTIVE state. In addition, the operations include entering the RRC_INACTIVE state. The operations also include performing, while the UE is in the RRC_INACTIVE state, an initial data transmission without transitioning from the RRC_INACTIVE state to a RRC_CONNECTED state. Additionally, the operations include monitoring a physical downlink control channel (PDCCH) for a UE dedicated scheduling for a transmission or reception of a subsequent data during an active period, while the UE is in the RRC INACTIVE state. Furthermore, the operations include performing the transmission or reception of the subsequent data based on the monitoring of the PDCCH.

In some embodiments, the operations also include receiving, from the base station, one or more configurations for the transmission or reception of the subsequent data.

In some embodiments, the one or more configurations is received as part of the RRC release message.

In some embodiments, the one or more configurations are received as part of a System Information Block (SIB), wherein the SIB is broadcasted by the base station.

In some embodiments, the operations include receiving, from the base station, an indication indicating a configuration to use for the transmission or reception of the subsequent data from among the one or more of configurations.

In some embodiments, the operations also include receiving a value for a timer for the active period. The value for the timer is part of the one or more configurations. The operations further include stop monitoring the PDCCH for the transmission or reception of the subsequent data, on expiration of the timer for the active period.

In some embodiments, the operations include applying a predefined configuration for the transmission or reception of the subsequent data.

In some embodiments, the operations include receiving a start indication of the active period from the base station after the initial data transmission, stop monitoring the PDCCH for the transmission or reception of the subsequent data, on reception of a stop indication of the active period from the base station.

In some embodiments, the operations include receiving a start indication of the active period from the base station after the initial data transmission. The start indication includes a value for a timer for the active period. The operations also include stop monitoring the PDCCH for the transmission or reception of the subsequent data, on expiration of the timer for the active period.

In some embodiments, the start indication is a layer 1 (L1) signaling.

In some embodiments, the start indication is a medium access control (MAC) control elements(CE).

In some embodiments, the start indication is an RRC signaling, wherein the RRC signaling includes one or more configurations for the transmission or reception of the subsequent data.

In some embodiments, the operations include verifying the PDCCH for the UE dedicated scheduling for the transmission or reception of the subsequent data during the active period based on a TC-RNTI type, a I-RNTI type, or a CG-RNTI type of an RNTI.

In some embodiments, the operations include monitoring the UE dedicated scheduling within an initial bandwidth part (BWP), and monitoring the UE dedicated scheduling in a common search space for the transmission or reception of the subsequent data during the active period.

In some embodiments, the operations include receiving a start indication of the active period for subsequent data transmission or reception from the base station of the current cell after the initial data transmission and an indication indicating a measurement configuration. The measurement configuration is based on SIB3 or SIB4 configuration associated with the UE in an IDLE or an INACTIVE state. The measurement configuration includes at least a predetermined threshold.

In some embodiments, the operations include receiving a dedicated signaling including a measurement configuration for a measurement during the active period.

In some embodiments, the operations include determining whether one or more conditions for triggering a measurement event are met. The one or more conditions include the radio quality of the current cell is lower than the received predetermined threshold and the radio quality of the neighboring cell is higher than the predetermined threshold. The operations also include performing a neighboring cell measurement in response to determining the one or more conditions for triggering a measurement event are met.

In some embodiments, the operations include triggering a measurement report in response to determining the one or more conditions for triggering a measurement event are met. The operations also include receiving a dedicated RRC message including an RRC resume message, wherein the dedicated RRC message triggers the UE to transition to the CONNECTED state. The operations also include entering the CONNECTED state, transmitting an RRC ResumeComplete message to the base station of a current camping cell, receiving a handover(HO) command to initiate of a handover of the UE to a neighboring cell, and transmitting a handover CommandComplete message to the base station of the neighboring cell.

In some embodiments, the operations include triggering a measurement report in response to determining the one or more conditions for triggering a measurement event are met, receiving a dedicated RRC message including an RRC resume message and a HO command to initiate of a handover of the UE to a neighboring cell. The dedicated RRC message triggers the UE to transition to the CONNECTED state. The operations include entering the CONNECTED state, and transmitting an RRC ResumeComplete message to the base station of the neighboring cell.

In some embodiments, the operations include triggering a measurement report in response to determining the one or more conditions for triggering a measurement event are met, and transmitting an RRC Resume Request message or performing data transmission to the base station of the neighboring cell.

In some embodiments, the operations include transmitting a UE preference to the base station of the current cell, receiving a dedicated RRC message including RRC resume message and a HO command to initiate of a handover of the UE to a neighboring cell. The dedicated RRC message triggers the UE to transition to the CONNECTED state. The operation also include entering the CONNECTED state, and transmitting an RRC ResumeComplete message to the base station of the neighboring cell.

In another further aspect of the disclosure, embodiments of the present disclosure also provide a baseband processor configured to perform the processes as described above.

BRIEF DESCRIPTION OF THE DRAWINGS

The present invention is illustrated by way of example and not limitation in the figures of the accompanying drawings in which like references indicate similar elements.

FIG. 13 is an illustration of some embodiments of a UE operation based on the measurement event is triggered, according to some embodiments.

FIG. 14 is an illustration of some embodiments of a UE operation based on the measurement event is triggered, according to some embodiments.

DETAILED DESCRIPTION

Figure 1:
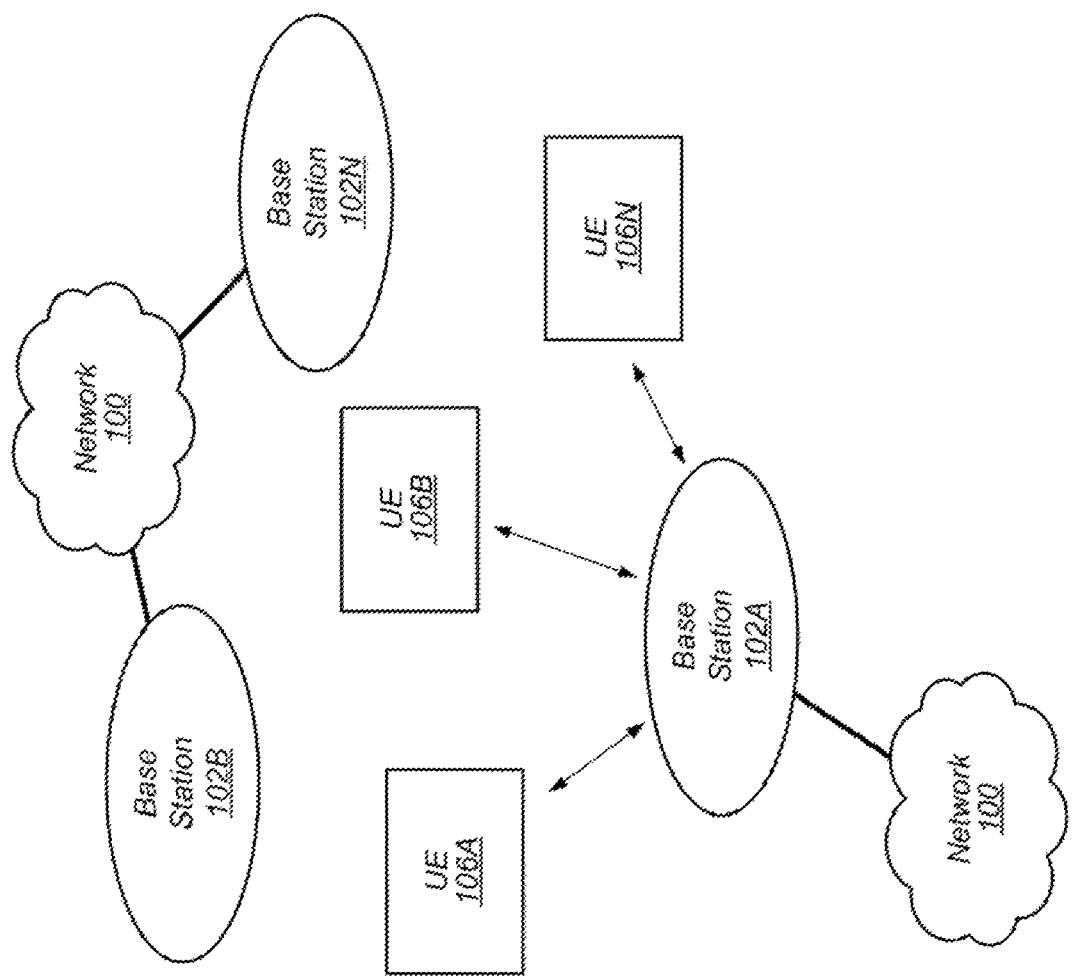
FIG. 1 illustrates an example wireless communication system according to some embodiments.

Methods and apparatuses that enable an apparatus of a device to monitor the potential network scheduling after an initial data transmission while the UE is in the INACTIVE state is described. The UE receives a Radio Resource Control (RRC) release message from a base station. The RRC release message comprises a suspend configuration to transition the UE to an RRC_INACTIVE state. The UE enters the RRC_INACTIVE state. The UE performs, while the UE is in the RRC_INACTIVE state, an initial data transmission without transitioning from the RRC_INACTIVE state to a RRC_CONNECTED state. The UE monitors a physical downlink control channel (PDCCH) for a UE dedicated scheduling for a transmission or reception of a subsequent data during an active period, while the UE is in the RRC INACTIVE state. The UE performs the transmission or reception of the subsequent data based on the monitoring of the PDCCH. In this manner, the UE can keep on monitoring the potential network scheduling after the initial data transmission while the UE is in the INACTIVE state, thereby reducing the data transmission latency and the amount of signaling overhead that occurs during state transitions. Accordingly, this enhanced mechanism can leverage the benefit of data transmission while the UE is in INACTIVE state without transitioning from the RRC_INACTIVE state to a RRC_CONNECTED state.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5GNR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
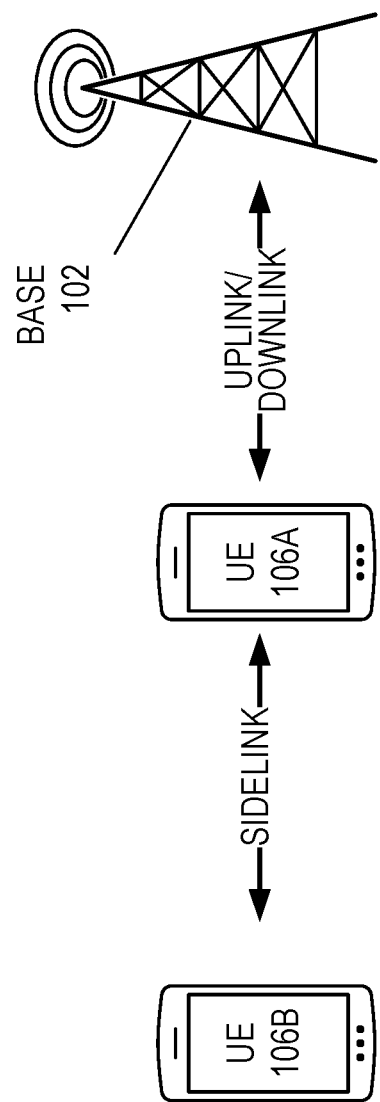
FIG. 2 illustrates a base station (BS) in communication with a user equipment (UE) device according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

ULE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/RPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
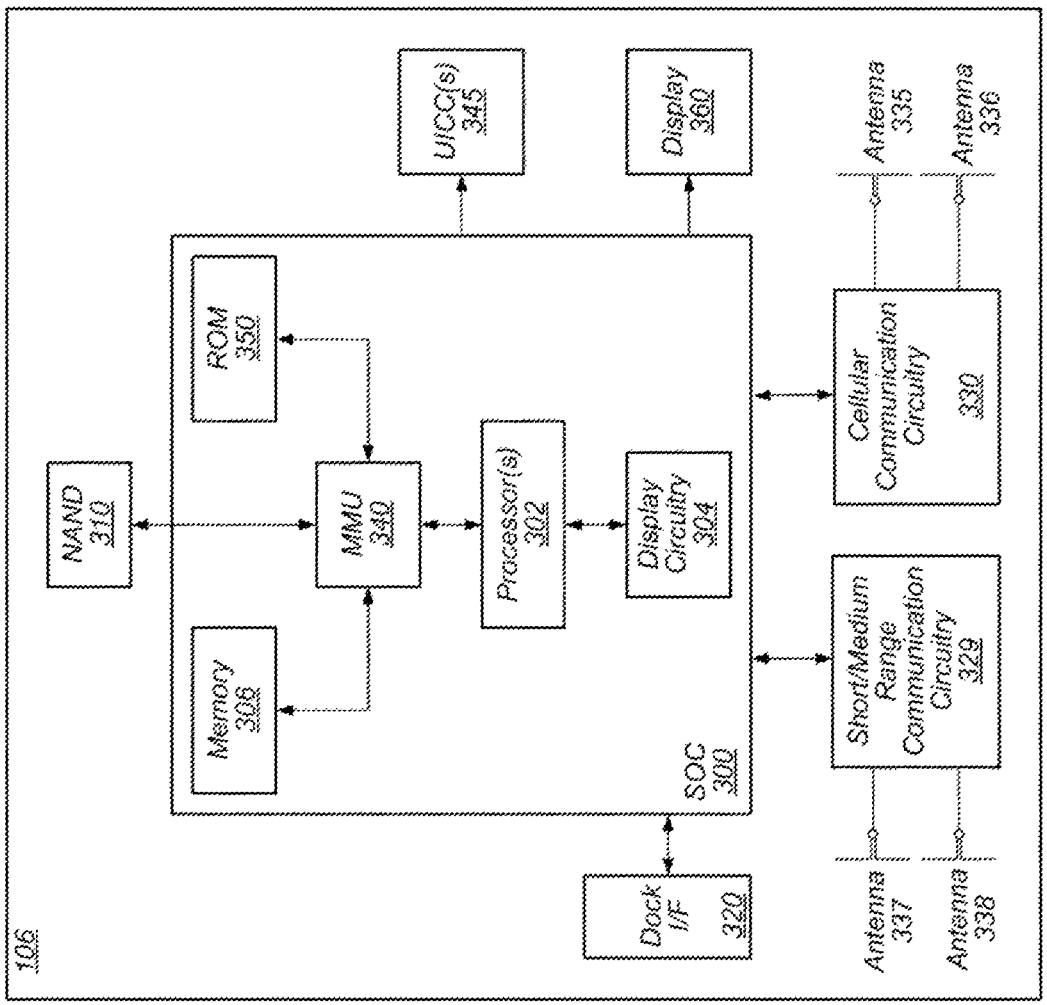
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
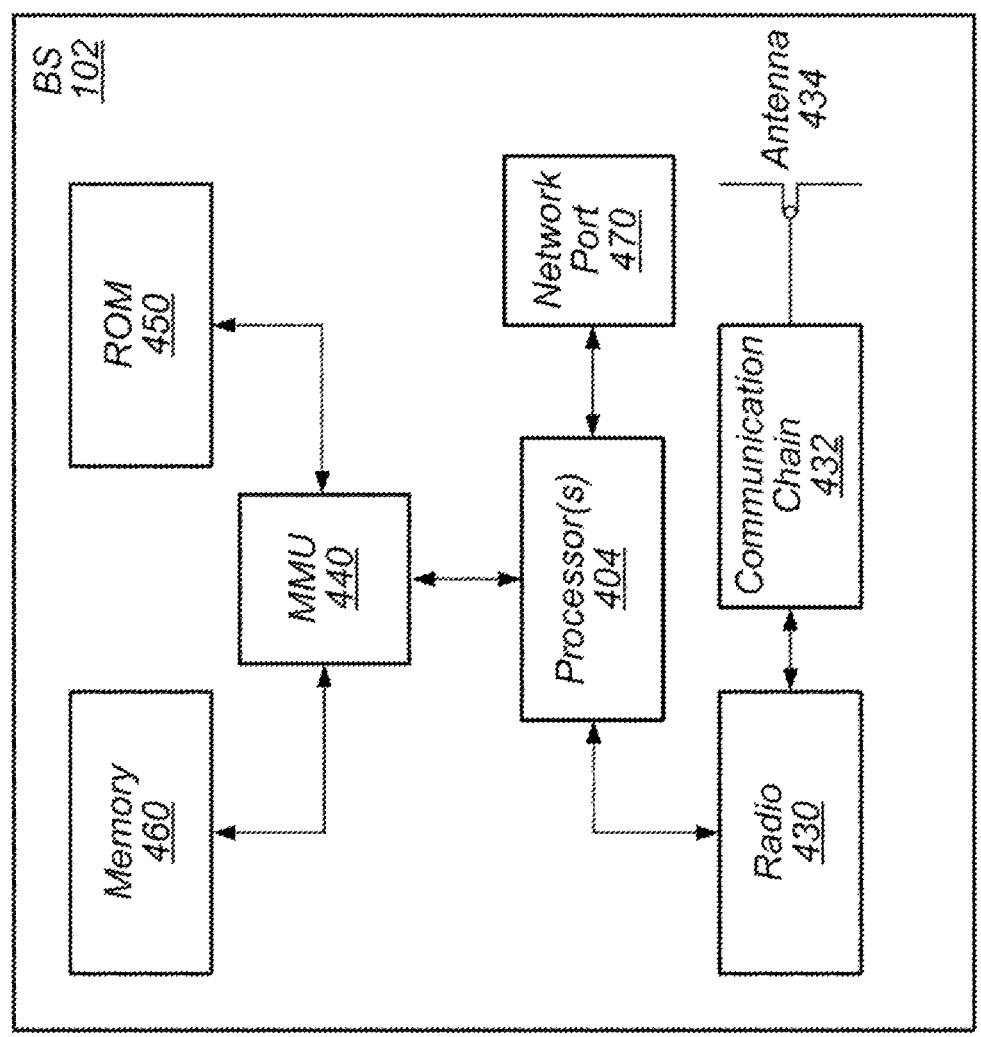
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
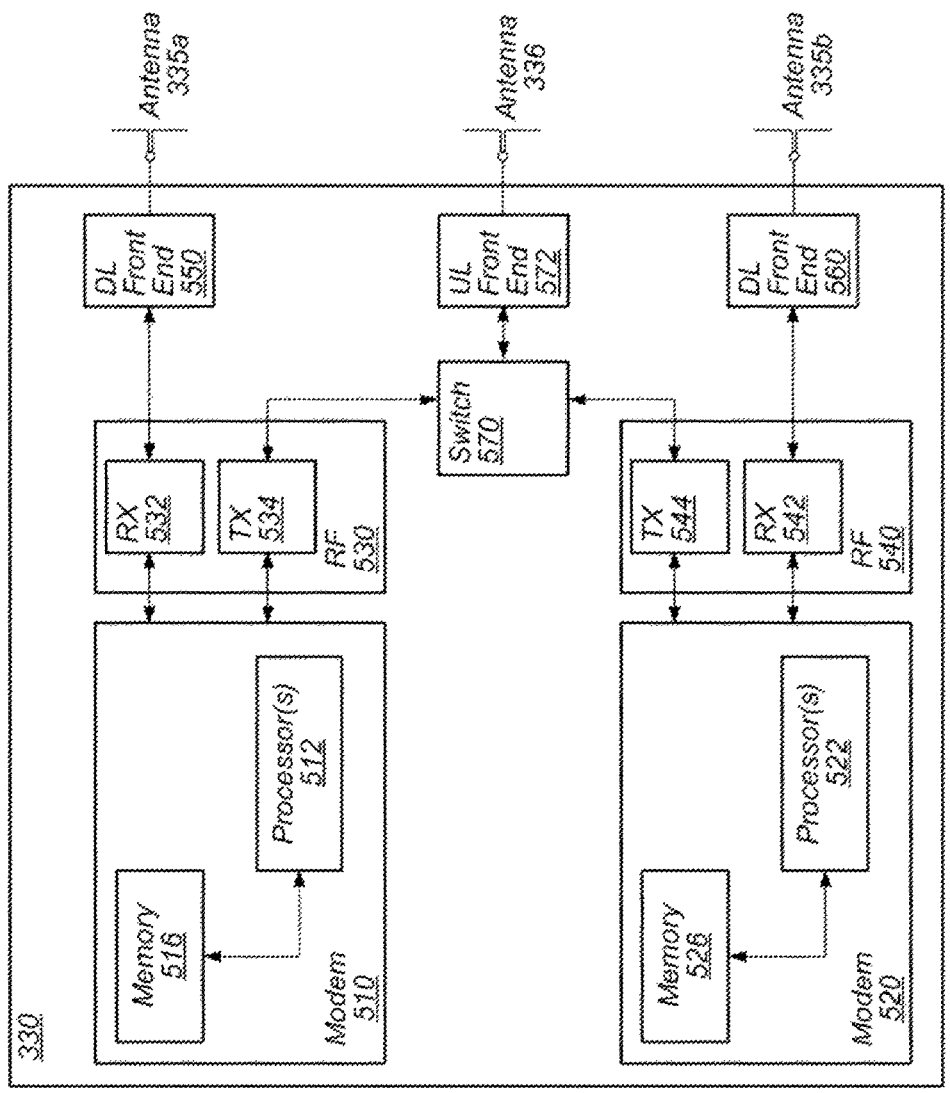
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
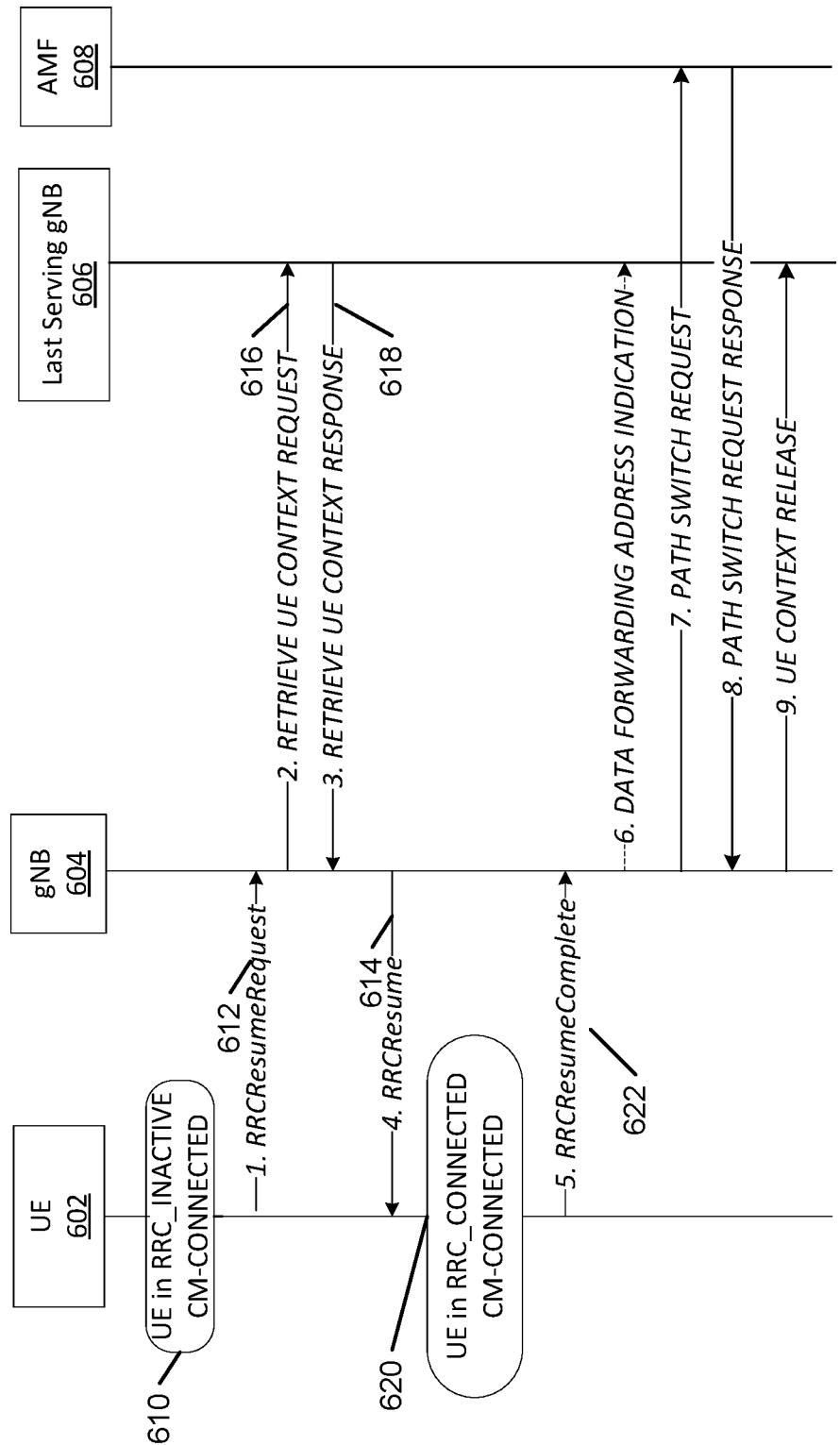
FIG. 6 is an illustration of some embodiments of a UE triggered transition from RRC_INACTIVE state to RRC_CONNECTED state, according to some embodiments.

FIG. 6 illustrates a state transition from RRC_INACTIVE state 610 to RRC_CONNECTED state 620 triggered by the UE (e.g., 602). RRC_INACTIVE state 610 hides the radio connection state from the core network to reduce the signaling overhead and tunnel establishments between the radio network and the core network. In smartphones, for example, background applications such as instant messengers continue to exchange data with the network to keep the connections alive on a frequent basis even when the screen of the smartphones is turned off.

The network (e.g., 604) can instruct the UE 602 to transition to the RRC_INACTIVE state 610 with an RRC Release message that includes a 'suspendConfig'. When the UE needs to transition from RRC_INACTIVE state 610 to RRC_CONNECTED state 620, the resumption of a suspended RRC connection can be initiated by upper layers or by RRC layer to perform an RNA update or by RAN paging from NG-RAN. The RRC connection resume procedure reactivates AS security and re-establishes SRB(s) and DRB(s).

The procedure to transition from RRC_INACTIVE state 610 to RRC_CONNECTED state 620 is triggered by the UE either in response to a paging, when the UE 602 has uplink data, for example. While the UE 602 is in RRC_INACTIVE state, the UE triggers an RRC connection re-activation procedure by sending RRCResumeRequest to the network (e.g., base station or gNB 604). During the RRC_INACTIVE state, the UE 602 remains CM-CONNECTED. Upon receiving RRCResumeRequest 612, the network 604 retrieves the UE Context Request 616 based on the UE Context ID, performs the necessary mobility actions, and responds with UE Context Response 618. Upon the reception of the RRCResume 614, the UE 602 confirms successful completion of an RRC connection resumption procedure by sending RRCResumeComplete (DCCH) message 622 on SRB1 using AM mode.

Figures 7A, 7B:
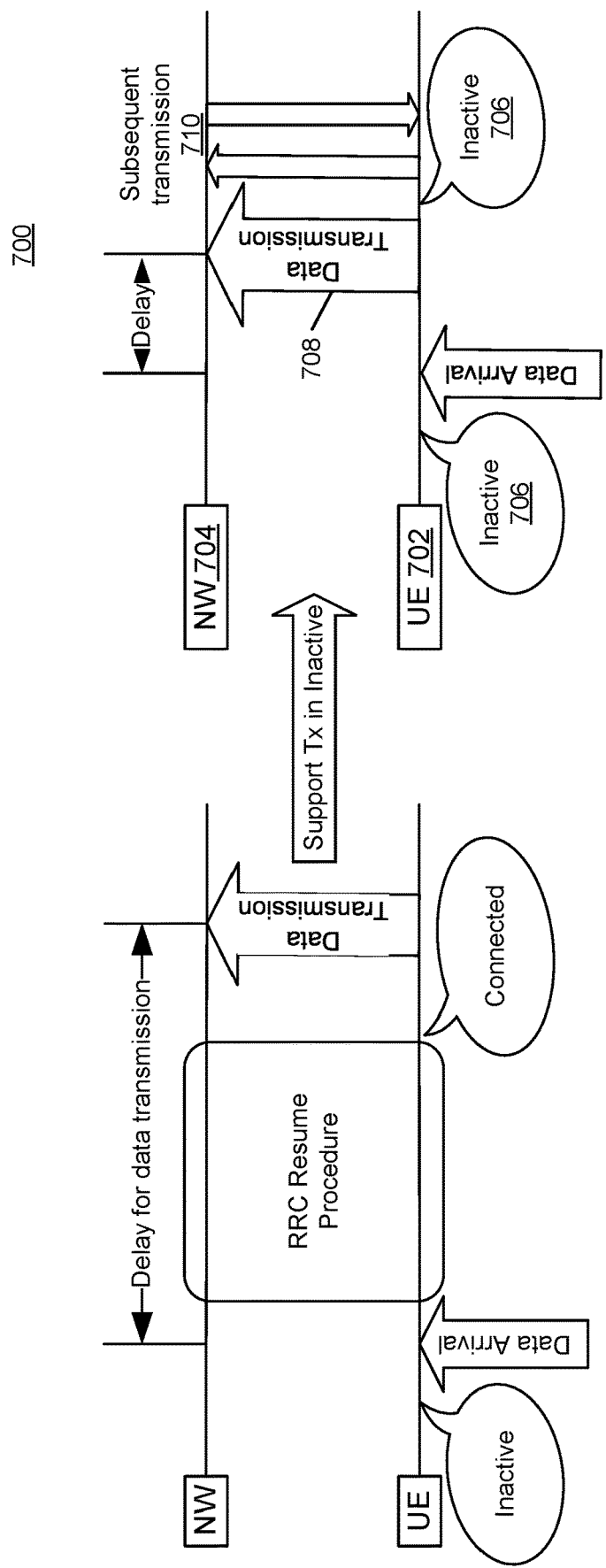
FIG. 7A is an illustration of some embodiments of legacy procedure, according to some embodiments.
FIG. 7B is an illustration of some embodiments of a small data transmission, according to some embodiments.

FIG. 7B shows an enhancement of the embodiments 700 described in the present disclosure in contrast to a legacy procedure (e.g., FIG. 7A) for a subsequent data transmission 710 when the UE 702 is in INACTIVE state 706. In contrast to the legacy procedure, embodiments 700 described in the present disclosure can be used for a subsequent transmission 710 when the UE 702 is in INACTIVE state after an initial data transmission 708, thereby avoiding the network 704 to perform RAN paging to trigger the UE 702 to enter CONNECTED state for feedback reception. The described embodiments 700 allow data (e.g., small data) transmission in RRC INACTIVE state without a state transition to RRC CONNECTED state. In this manner, the UE energy efficiency can be enhanced when small data is transmitted in RRC INACTIVE state.

Figure 8:
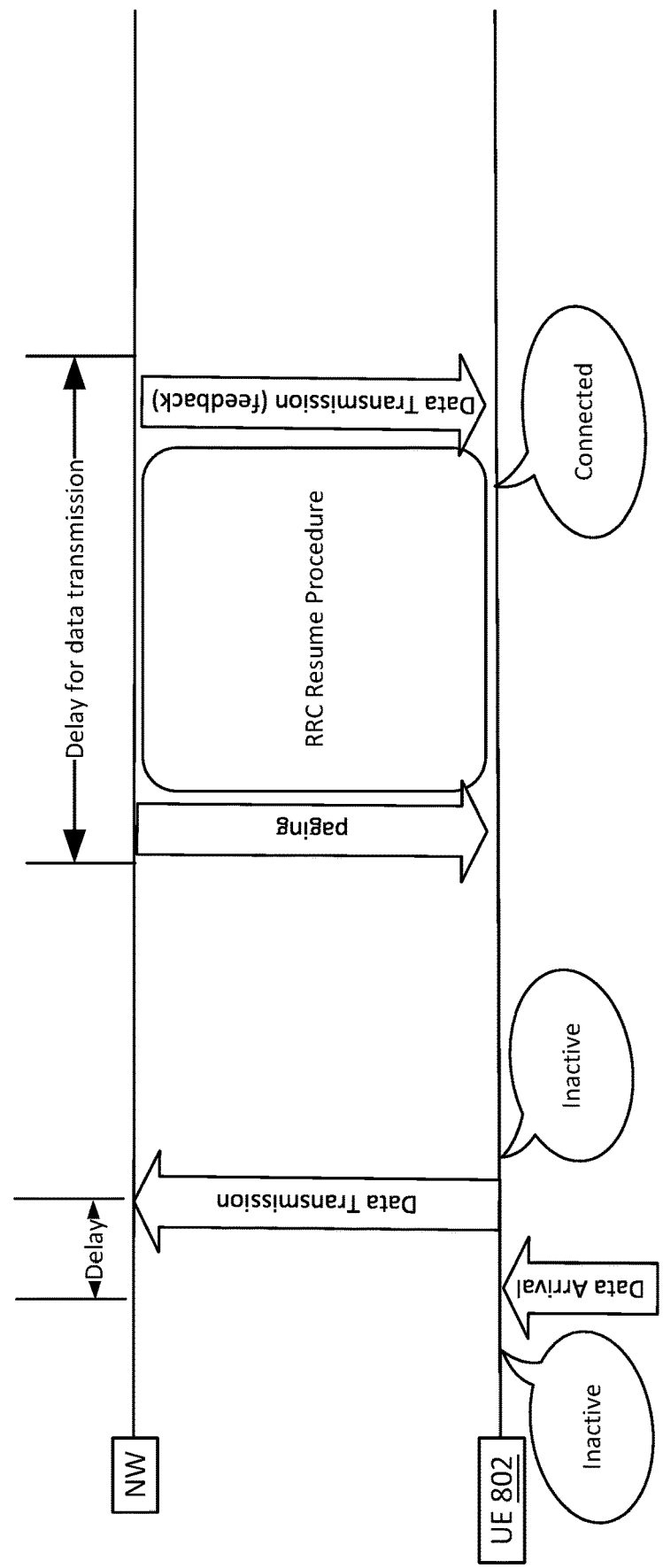
FIG. 8 is an illustration of some embodiments of uplink/downlink transmission and feedback transmission, according to some embodiments.

As illustrated in FIG. 8, an uplink (UL) or a downlink data transmission is accompanied a feedback transmission (e.g., TCP ACK, or RLC status report). If the UE 802 performs the initial UL transmission while in the INACTIVE state and then return to the INACTIVE state. After the UE returns to the INACTIVE state, network has to perform RAN paging to trigger the UE to enter the CONNECTED state for feedback reception when the network transmits the feedback in the downlink direction. Such procedure will destroy the benefit of direct transmission in INACTIVE state. In contrast, embodiments described herein enable the UE to continue monitoring a physical downlink control channel (PDCCH) for a UE dedicated scheduling for a period of time (i.e. active period) for potential subsequent data transmission or reception after the UE performs an initial uplink (UL) data transmission. Network can control the subsequent data transmission or reception based on explicit configuration or timer based control.

Figure 9A:
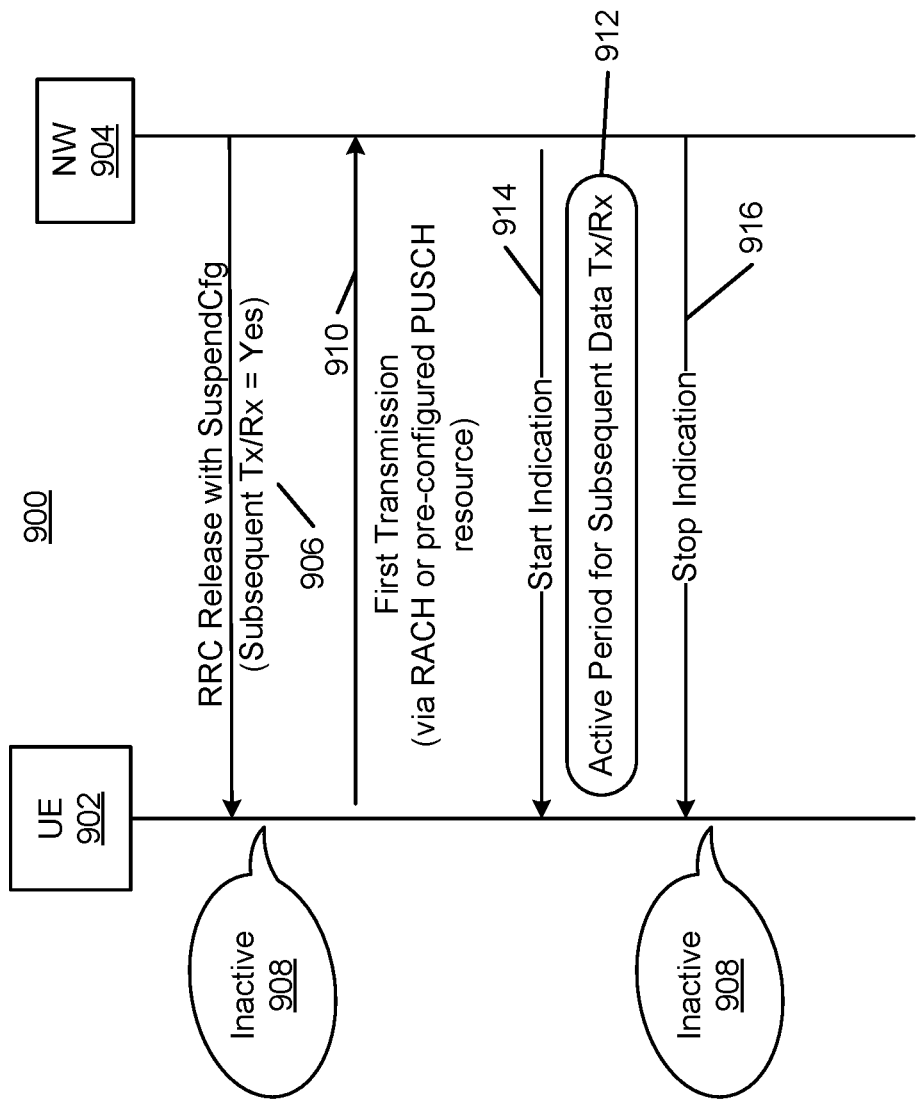
FIGS. 9A-9C are illustrations of some embodiments of a configuration for the subsequent data transmission/reception, according to some embodiments.

FIG. 9A illustrates a communication flow 900 between a UE 902 and a network 904, according some embodiments. In some embodiments, for example, the UE 902 receives a Radio Resource Control (RRC) release message from a network 904 at 906. The RRC release message includes a suspend configuration to transition the UE to an RRC_INACTIVE state 908. After the UE 902 receives the RRC release message, the UE 902 enters the RRC_INACTIVE state 908. Then, the UE 902 performs, while the UE is in the RRC_INACTIVE state 908, an initial data transmission at 910 without transitioning from the RRC_INACTIVE state to a RRC_CONNECTED state. While the UE is in the RRC INACTIVE state 908, the UE 902 monitors a physical downlink control channel (PDCCH) for a UE dedicated scheduling for a transmission or reception of a subsequent data during an active period 912. Thereafter, the UE 902 performs the transmission or reception of the subsequent data based on the monitoring of the PDCCH.

In some other embodiments, a network 904 receives an initial data from the UE 902 is in a RRC_INACTIVE 908 while the UE 902 does not transition from the RRC_INACTIVE state 908 to a RRC_CONNECTED state. The network 904 transmits a physical downlink control channel (PDCCH) for a UE dedicated scheduling for a transmission or reception of a subsequent data during an active period 912, while the UE 902 is in the RRC INACTIVE state 908. The network 904 receives or transmits the subsequent data transmission based on the dedicated scheduling.

In some other embodiments, the network 904 transmits an indication indicating a configuration to use for the transmission or reception of the subsequent data from among the one or more of configurations.

Figure 9B:
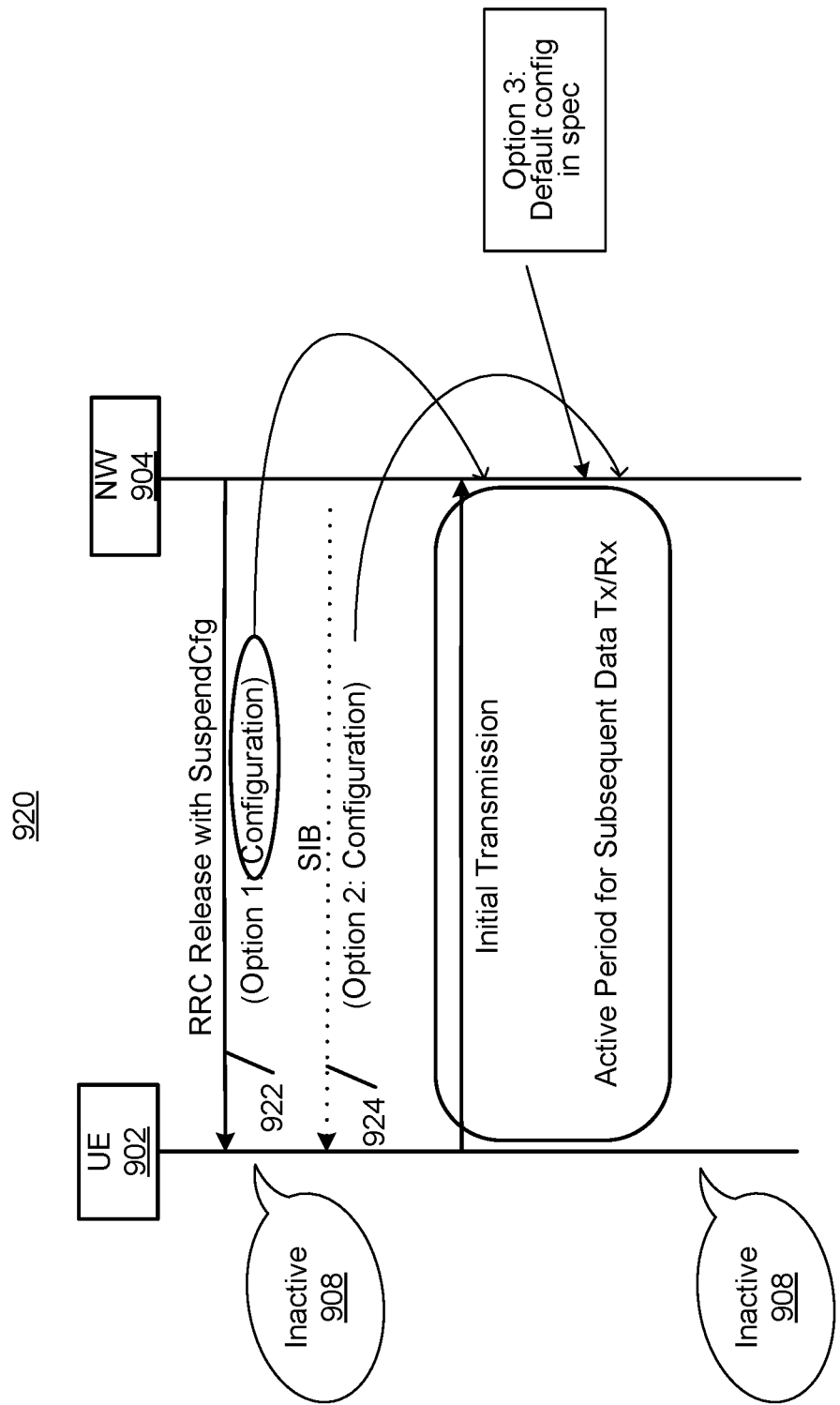

FIG. 9B illustrates a communication flow 920 between a UE 902 and a network 904, according some embodiments. In some embodiments, the UE 902 receives, from the network 904, one or more configurations for the transmission or reception of the subsequent data. In these embodiments, the one or more configurations are received as part of the RRC release message at 922. In these embodiments, the one or more configurations are also received as part of a System Information Block (SIB) at 924. The SIB is broadcasted by the network 904.

In some embodiments, the UE receives, from the base station, an indication indicating a configuration to use for the transmission or reception of the subsequent data from among the one or more of configurations.

Figure 9C:
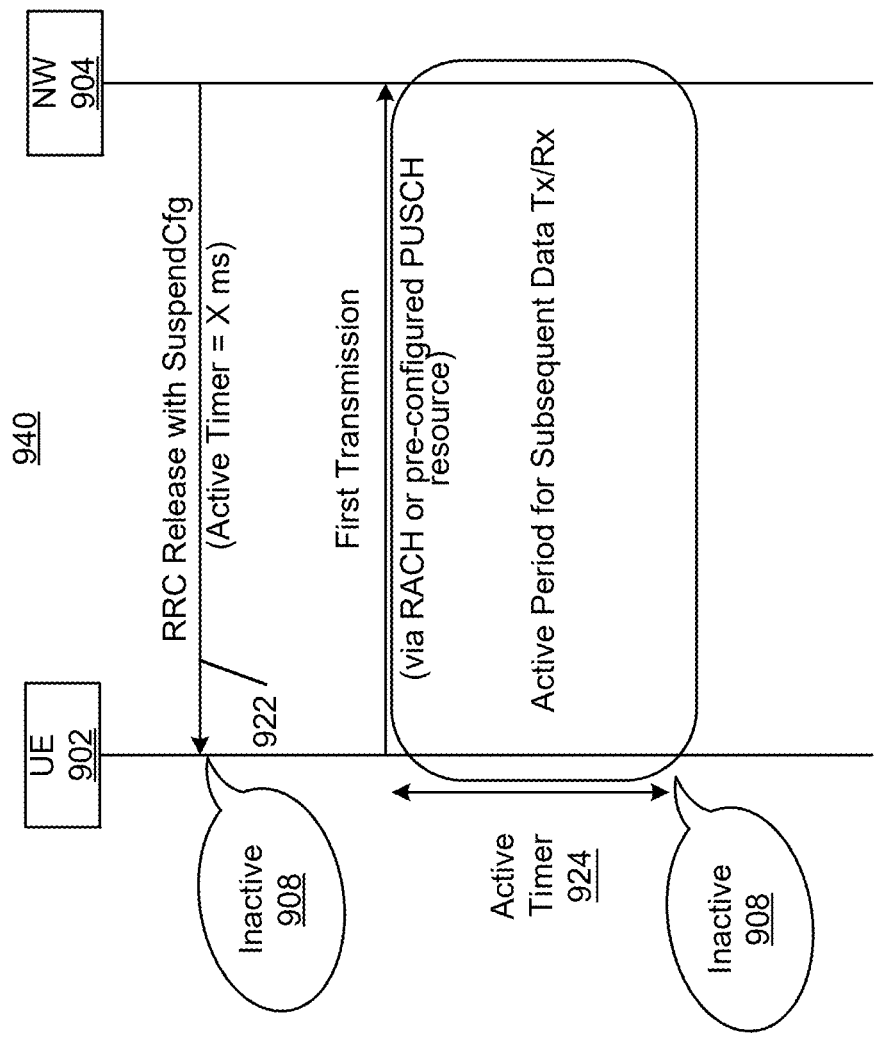

FIG. 9C illustrates a communication flow 940 between a UE 902 and a network 904, according some embodiments. In some embodiments, the UE 902 receives a value for a timer 924 for the active period at 942. The value for the timer 924 is part of the one or more configurations. Then, the UE 902 stop monitoring the PDCCH for the transmission or reception of the subsequent data, on expiration of the timer 924 for the active period.

In some embodiments, the UE 902 applies a predefined configuration for the transmission or reception of the subsequent data.

In some embodiments (see FIG. 9A), the UE 902 receives a start indication of the active period from the network 904 at 914 after the initial data transmission 910. The UE 902 stops monitoring the PDCCH for the transmission or reception of the subsequent data, on reception of a stop indication of the active period at 916 from the network 904.

In some embodiments (see FIG. 9C), the UE 902 receives a start indication of the active period from the base station after the initial data transmission. The start indication comprises a value for a timer 924 for the active period. The UE stops monitoring the PDCCH for the transmission or reception of the subsequent data, on expiration of the timer 924 for the active period.

In some embodiments, the network 904 transmits a start indication of the active period from the base station after the initial data transmission. A monitoring of the PDCCH for the transmission or reception of the subsequent data stops on reception of a stop indication of the active period at the UE.

In some embodiments, the network 904 transmits a start indication of the active period to the UE after the initial data transmission. The start indication includes a value for a timer for the active period. The monitoring of the PDCCH for the transmission or reception of the subsequent data stops on expiration of the timer for the active period.

In some embodiments, the start indication is a layer 1 (L1) signaling.

In some other embodiments, the start indication is a medium access control (MAC) control elements(CE).

In some embodiments, the start indication is an RRC signaling. The RRC signaling includes one or more configurations for the transmission or reception of the subsequent data.

In some embodiments, the network 904 scrambles the PDCCH for the UE dedicated scheduling for the transmission or reception of the subsequent data during an active period based on a TC-RNTI type, a I-RNTI type, or a CG-RNTI type of an RNTI.

In some embodiments, the UE verifies the PDCCH for the UE dedicated scheduling for the transmission or reception of the subsequent data during the active period based on a TC-RNTI type, a I-RNTI type, or a CG-RNTI type of an RNTI. The UE behavior while the UE is in an active period is the same as the legacy in CONNECTED mode. For example, the UE dedicated scheduling can be scrambled via one or more RNTI. (1) T-C-RNTI (allocated by the network via the initial transmission), (2) I-RNTI or truncated I-RNTI, and (3) CG-RNTI (if the initial transmission is performed via a pre-CG resource based on one or more pre-CG configuration). The one or more pre-CG configurations refers to pre-configured physical uplink shared channel (PUSCH) resources configurations.

In some embodiments, the UE monitors the UE dedicated scheduling within an initial bandwidth part (BWP). The UE also monitors the UE dedicated scheduling in a common search space for the transmission or reception of the subsequent data during the active period.

Layer 1 (L1) behavior while the UE is in active period is the same as legacy CONNECTED mode configuration. L1 does not support CA/DC but it supports Nta maintenance, Power control, L1 CSI report, L1 ACK/NACK, BFD, etc. The transmission is limited in the initial BWP, and/or the PDCCH scheduling is only in the common search space to reduce the UE complexity.

L2 behavior while the UE is in active period is the same as legacy CONNECTED mode configuration. MAC: BSR, PHR, DRX, UL/DL HARQ, TA, CG/SPS, new LCP restriction. As for RLC/PDCP aspect: not support duplication/split bearer. SDAP is according to legacy CONNECTED mode.

For serving cell measurement, measurement requirement is similar as CONNECTED mode, optional support L3 filter, optionally Measurement Report. For neighbor cell measurement, same as legacy IDLE/INACTIVE measurement.

In some embodiments, RLM is the same as CONNECTED mode RLM procedure.

In some other embodiments, it does not support RLM, or based on configuration.

Figure 11:
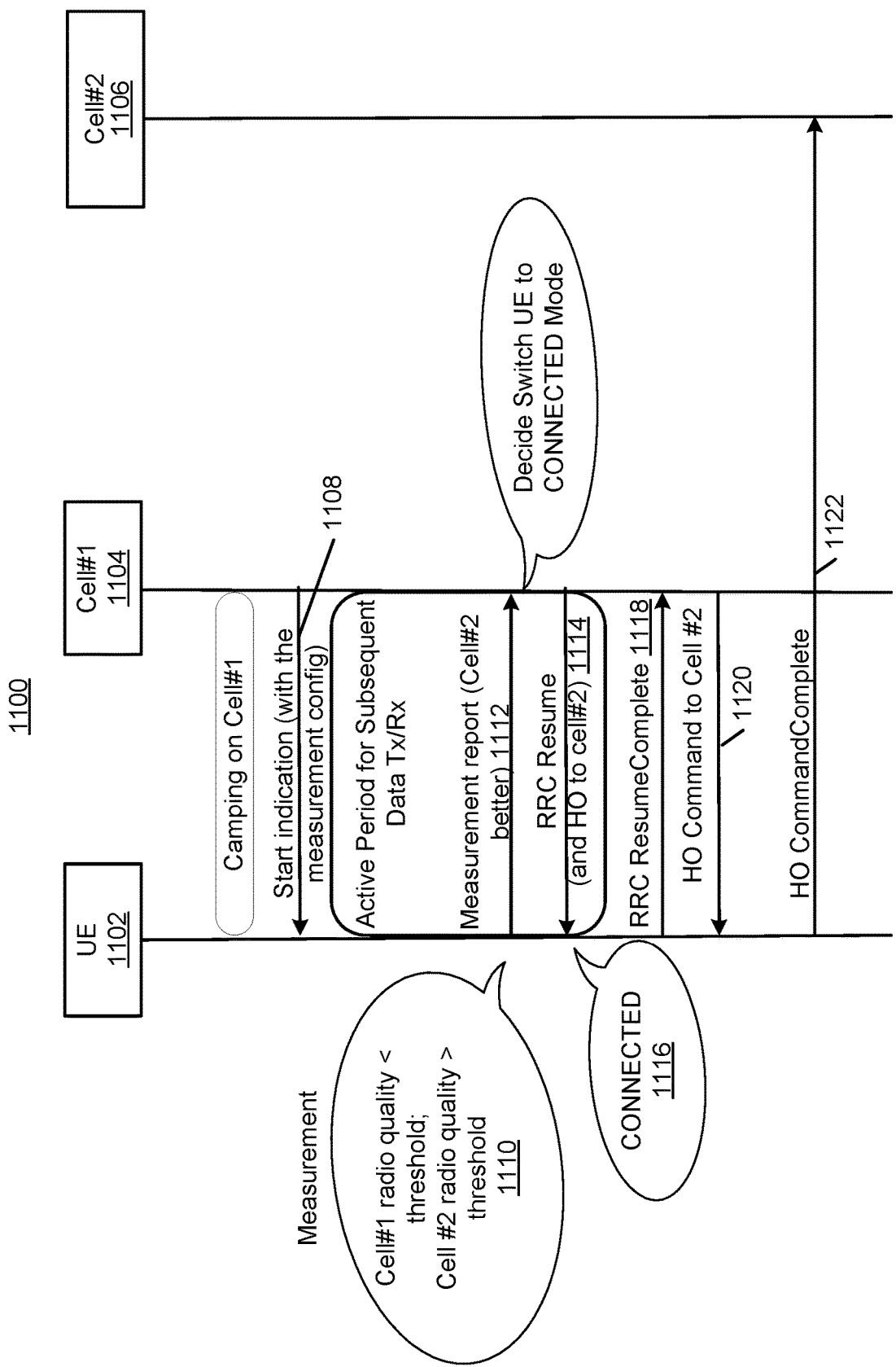
FIG. 11 is an illustration of some embodiments of a UE operation based on the measurement event is triggered, according to some embodiments.

FIG. 11 illustrates a communication flow 1100 between a UE 1102 and a base station, according to some embodiments. In some embodiments, at 1108 the UE 1102 receives a start indication of the active period for subsequent data transmission or reception from the base station of the current cell 1104 after the initial data transmission and an indication indicating a measurement configuration. The measurement configuration is based on SIB3 or SIB4 configuration associated with the UE in an IDLE or an INACTIVE state. The measurement configuration includes at least a predetermined threshold.

In some embodiments, the UE receives a dedicated signaling including a measurement configuration for a measurement during the active period.

Figure 10:
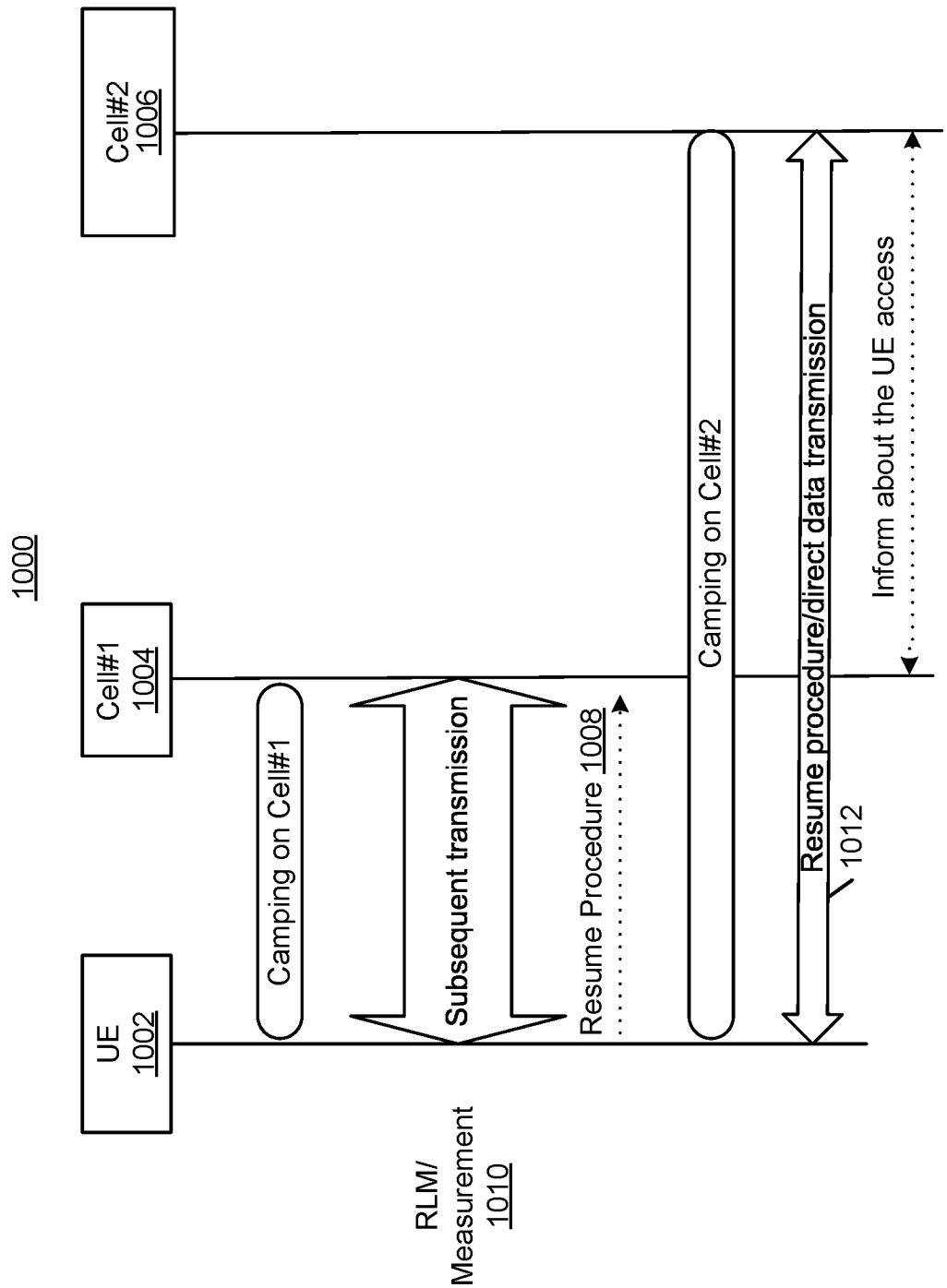
FIG. 10 is an illustration of some embodiments of UE behavior during the subsequent active period in INACTIVE state, according to some embodiments.

FIG. 10 illustrates a communication flow 1000 between a UE 1002 and a base station. In some embodiments, the UE keeps RLM and IDLE/INACTIVE state measurement 1010. For example, if the UE radio quality is lower than a threshold (or RLF is triggered), the UE 1002 triggers Resume procedure at 1008. If the UE 1002 moves to another cell 1006, the UE 1002 triggers the resume procedure/direct data transmission at 1012 in the new accessed cell 1006.

FIG. 11 illustrates a communication flow 1100 between a UE 1102 and a base station. In some embodiments, the UE 1102 determines whether one or more conditions 1110 for triggering a measurement event are met, wherein the one or more conditions 1110 includes: the radio quality of the current cell is lower than the received predetermined threshold, and the radio quality of the neighboring cell is higher than the predetermined threshold. The UE 1102 performs a neighboring cell measurement in response to determining the one or more conditions for triggering a measurement event are met.

In some embodiments, at 1112, the UE 1102 triggers a measurement report in response to determining the one or more conditions for triggering a measurement event are met. The receives a dedicated RRC message including an RRC resume message at 1114. The dedicated RRC message triggers the UE 1102 to transition to the CONNECTED state 1116. The UE 1102 enters the CONNECTED state 1116. At 1118, the UE 1102 transmits an RRC ResumeComplete message to the base station of a current camping cell 1104. At 1120, the UE 1102 receives a handover(HO) command to initiate of a handover of the UE 1102 to a neighboring cell 1106. At 1122, the UE 1122 transmits a handover CommandComplete message to the base station of the neighboring cell 1106.

Figure 12:
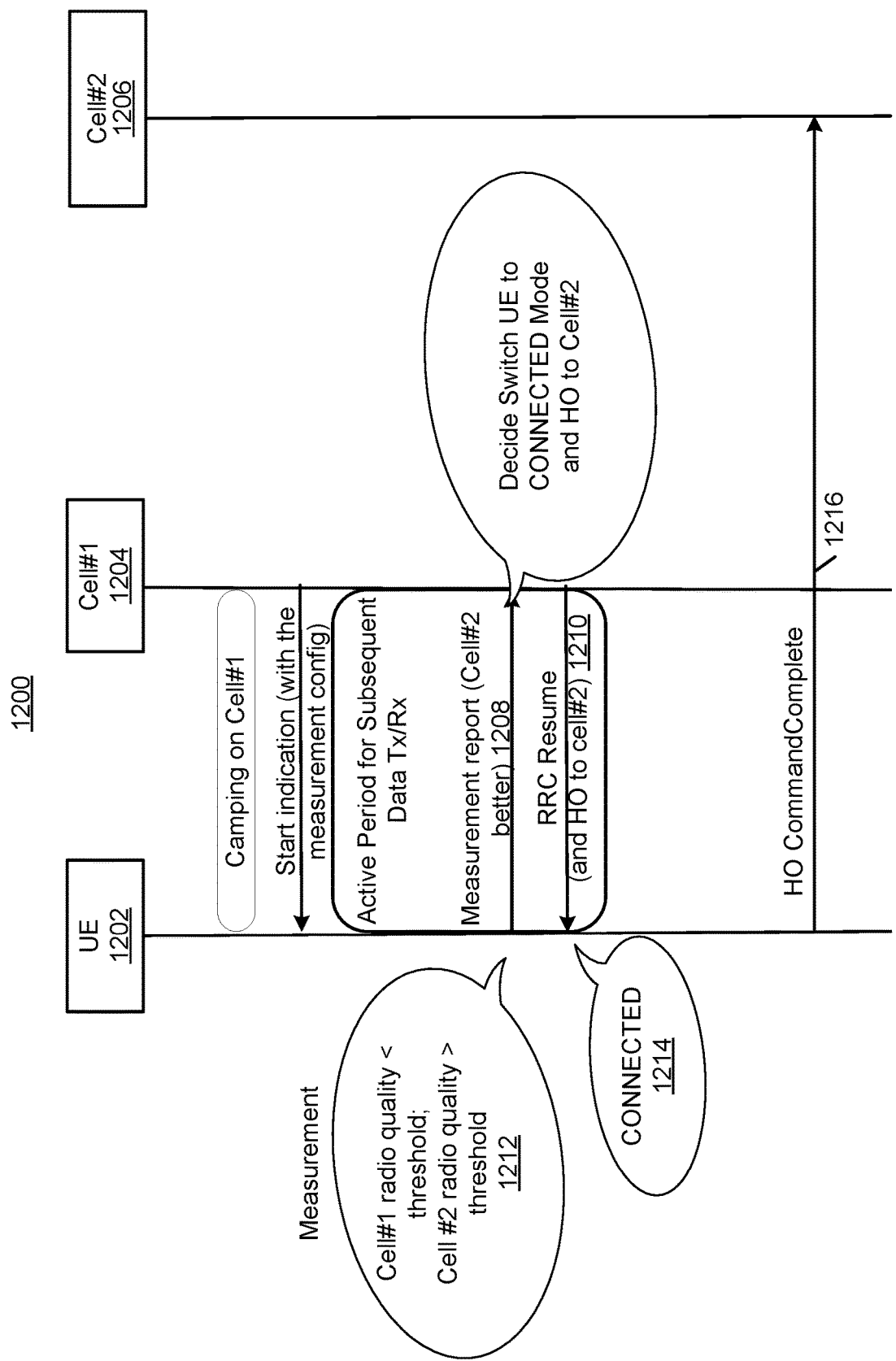
FIG. 12 is an illustration of some embodiments of a UE operation based on the measurement event is triggered, according to some embodiments.

FIG. 12 illustrates a communication flow 1200 between a UE 1202 and a base station, according to some embodiments. In some embodiments, at 1208, the UE 1202 triggers a measurement report in response to determining the one or more conditions 1212 for triggering a measurement event are met. At 1210, the UE 1202 receives a dedicated RRC message including an RRC resume message and a HO command to initiate of a handover of the UE 1202 to a neighboring cell 1206. The dedicated RRC message triggers the UE 1202 to transition to the CONNECTED state 1214. The UE 1202 enters the CONNECTED state 1214. At 1216, the UE 1202 transmits an RRC ResumeComplete message to the base station of the neighboring cell 1206.

FIG. 13 illustrates a communication flow 1300 between a UE 1302 and a base station, according to some embodiments. In some embodiments, the UE 1302 performs cell reselection directly in response to determining the one or more conditions 1308 for triggering a measurement event are met. The UE 1302 transmits, at 1310, an RRC Resume Request message or performing data transmission to the base station of the neighboring cell 1306.

FIG. 14 illustrates a communication flow 1400 between a UE 1402 and a base station, according to some embodiments. In some embodiments, at 1408, the UE 1402 transmits a UE preference to the base station of the current cell 1404. The UE receives a dedicated RRC message including RRC resume message and a HO command at 1410 to initiate of a handover of the UE 1402 to a neighboring cell 1406. The dedicated RRC message triggers the UE 1402 to transition to the CONNECTED state 1412. The UE enters the CONNECTED state. The UE 1402 transmits an RRC ResumeComplete message to the base station of the neighboring cell 1406.

In some embodiments, the processes or methods depicted in the preceding figures may be performed by a user equipment (UE) device including a processor In some other embodiments, the processes or methods depicted in the preceding figures may be performed by a baseband processor.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A user equipment (UE) device comprising:
   an antenna;
   a memory;
   a RF circuitry commutatively coupled to the antenna; and
   a processor configured to perform operations comprising:
   receiving a Radio Resource Control (RRC) release message from a base station, wherein the RRC release message comprises a suspend configuration to transition the UE to an RRC_INACTIVE state, and the RRC release message comprises one or more configurations for a transmission or reception of a subsequent data during an active period;
   receiving a dedicated signaling comprising a measurement configuration for a measurement to be performed during the active period, wherein the UE is in the RRC_INACTIVE state during the active period:
   entering the RRC_INACTIVE state;
   performing, while the UE is in the RRC_INACTIVE state, an initial data transmission without transitioning from the RRC_INACTIVE state to an RRC_CONNECTED state;
   monitoring, based on the one or more configurations, a physical downlink control channel (PDCCH) for a UE dedicated scheduling for the transmission or reception of the subsequent data during the active period, while the UE is in the RRC_INACTIVE state; and
   performing the transmission or reception of the subsequent data based on the monitoring of the PDCCH.

2. The UE of claim 1, wherein the processor is further configured to perform operations comprising:
   receiving, from the base station, a start indication of the active period; and
   stopping monitoring of the PDCCH for the transmission or reception of the subsequent data based on reception of a stop indication of the active period from the base station.

3. The UE of claim 1, wherein the one or more configurations are further received as part of a System Information Block (SIB), wherein the SIB is broadcasted by the base station.

4. A baseband (BB) processor of a user equipment (UE) device in a wireless communication system configured to perform operations comprising:
   receiving a Radio Resource Control (RRC) release message from a base station, wherein the RRC release message comprises a suspend configuration to transition the UE to an RRC_INACTIVE state, and the RRC release message comprises one or more configurations for transmission or reception of subsequent data during an active period;
   receiving a dedicated signaling comprising a measurement configuration for a measurement to be performed during the active period, wherein the UE is in the RRC_INACTIVE state during the active period;
   entering the RRC_INACTIVE state;
   performing, while the UE is in the RRC_INACTIVE state, an initial data transmission without transitioning from the RRC_INACTIVE state to an RRC_CONNECTED state;
   monitoring a physical downlink control channel (PDCCH) for a UE dedicated scheduling for the transmission or reception of the subsequent data during the active period, while the UE is in the RRC_INACTIVE state; and
   performing the transmission or reception of the subsequent data based on the monitoring of the PDCCH.

5. The BB of claim 4, wherein the one or more configurations are further received as part of a System Information Block (SIB), wherein the SIB is broadcasted by the base station.

6. The BB according to claim 4, wherein the processor is further configured to perform operations comprising:
   receiving, from the base station, an indication indicating a configuration to use for the transmission or reception of the subsequent data from among the one or more of configurations.

7. The BB of claim 4, wherein the processor is further configured to perform operations comprising:
   receiving a value for a timer for the active period, wherein the value for the timer is part of the one or more configurations; and stopping monitoring of the PDCCH for the transmission or reception of the subsequent data, on expiration of the timer for the active period.

8. The BB of claim 4, wherein the processor is further configured to perform operations comprising:
applying a predefined configuration for the transmission or reception of the subsequent data.

9. The BB of claim 4, wherein the processor is further configured to perform operations comprising:
receiving a start indication of the active period from the base station after the initial data transmission; and
stopping monitoring of the PDCCH for the transmission or reception of the subsequent data, on reception of a stop indication of the active period from the base station.

10. The BB of claim 4, wherein the processor is further configured to perform operations comprising:
receiving a start indication of the active period from the base station after the initial data transmission, wherein the start indication comprises a value for a timer for the active period; and
stopping monitoring of the PDCCH for the transmission or reception of the subsequent data on expiration of the timer for the active period.

11. The BB of claim 4, wherein the processor is further configured to perform operations comprising:
verifying the PDCCH for the UE dedicated scheduling for the transmission or reception of the subsequent data during the active period based on a TC-RNTI type, a 1-RNTI type, or a CG-RNTI type of an RNTI.

12. The BB of claim 4, wherein the processor is further configured to perform operations comprising:
monitoring the UE dedicated scheduling within an initial bandwidth part (BWP); and monitoring the UE dedicated scheduling in a common search space for the transmission or reception of the subsequent data during the active period.

13. The BB of claim 4, wherein the processor is further configured to perform operations comprising:
receiving a start indication of the active period for subsequent data transmission or reception from the base station of a current cell after the initial data transmission and an indication indicating a measurement configuration, wherein the measurement configuration is based on SIB3 or SIB4 configuration associated with the UE in an IDLE or an INACTIVE state, and wherein the measurement configuration comprises at least a predetermined threshold that is associated with radio quality for triggering a measurement event.

14. The BB of claim 13, wherein the processor is further configured to perform operations comprising:
performing cell reselection of a neighboring cell in response to determining one or more conditions for triggering a measurement event are met; and
transmitting an RRC Resume Request message or performing data transmission to the base station of the neighboring cell.

15. The BB of claim 13, wherein the processor is further configured to perform operations comprising:
transmitting a UE preference to the base station of the current cell;
receiving a dedicated RRC message comprising RRC resume message and a handover (HO) command to initiate of a handover of the UE to a neighboring cell, wherein the dedicated RRC message triggers the UE to transition to the RRC CONNECTED state;
entering the RRC CONNECTED state; and
transmitting an RRC ResumeComplete message to the base station of the neighboring cell.

16. A method, performed by a user equipment (LIE), comprising:
receiving a Radio Resource Control (RRC) release message from a base station, wherein the RRC release message comprises a suspend configuration to transition the UE to an RRC_INACTIVE state, and the RRC release message comprises one or more configurations for transmission or reception of a subsequent data during an active period;
receiving a dedicated signaling comprising a measurement configuration for a measurement to be performed during the active period, wherein the UE is in the RRC_INACTIVE state during the active period;
entering the RRC_INACTIVE state;
performing, while the UE is in the RRC_INACTIVE state, an initial data transmission without transitioning from the RRC_INACTIVE state to an RRC_CONNECTED state;
monitoring, based on the one or more configurations, a physical downlink control channel (PDCCH) for a UE dedicated scheduling for the transmission or reception of the subsequent data during the active period, while the UE is in the RRC_INACTIVE state; and
performing the transmission or reception of the subsequent data based on the monitoring of the PDCCH.

17. The method of claim 16, further comprising:
receiving a value for a timer for the active period, wherein the value for the timer is part of the one or more configurations; and
stopping monitoring of the PDCCH for the transmission or reception of the subsequent data, on expiration of the timer for the active period.

* * * * *